Patented Oct. 25, 1949

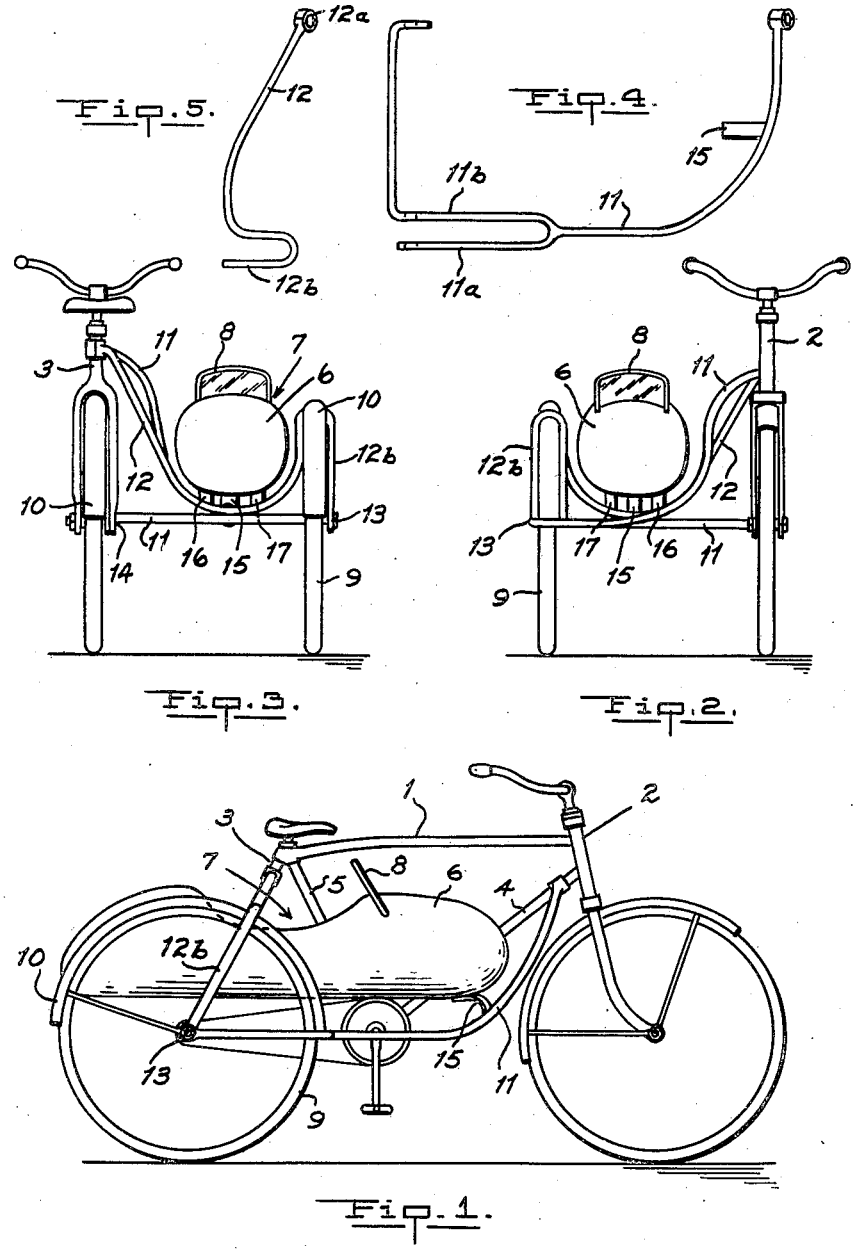

2,485,994

UNITED STATES PATENT OFFICE 2,485,994

BICYCLE SIDECAR

John Rolland Warner, Windsor, Ontario, Canada

Application August 12, 1946, Serial No. 689,905
In Canada June 1, 1946

3 Claims. (Cl. 280—203)

My invention relates to sidecars of the type designed primarily for attachment to pedal bicycles.

A great many varieties of sidecars have appeared on the market from time to time ever since the introduction of the modern bicycle. Some of these attachments were designed specifically for use with the push or pedal bicycle but the majority were developed as a result of the later popularity of the motorcycle. Available sidecars as they have appeared from time to time have all suffered from one or more common drawbacks. As a result no satisfactory bicycle sidecar is available on the market today. This is so because on the one hand such appliances must be sturdy and solidly built in order to withstand the stresses, strains and road hazards to which they are subjected during use. On the other hand they must be light in weight to permit of their propulsion with the bicycle, without undue exertion on the part of the bicycle rider.

Many sidecars have been developed since the popularity of the motorcycle became widespread. Motorcycle sidecar appliances are for the most part practical and suitable for the purpose for which designed. The principles of their construction are such as to render them inapplicable for use with a pedal bicycle. This is so because on the one hand the motive power being supplied by the motorcycle engine, the weight of the body, undercarriage springs, wheels, and other component parts of the sidecar is immaterial; while in the case of the bicycle sidecar where the propulsion is supplied by the bicycle rider, a weighty cumbersome sidecar is quite impractical.

The principal object of my invention is to provide a sidecar designed primarily for use with the bicycle combining sturdiness of construction with extreme lightness in weight.

A further object of this invention is to provide a sidecar that rides comfortable without the necessity of the usual heavy vehicle springs.

A still further object of the invention is to produce a sidecar that is readily attachable to, or detachable from, a standard bicycle with the minimum of effort.

Other features of my invention will become apparent by reference to the specifications and drawings. I wish to draw attention here to the fact that while the drawings illustrate as a preferred embodiment of my invention a small size sidecar designed to carry a child, I do not confine myself to any particular size. The principles of the invention as will be seen are equally applicable to cars designed for the carriage of adults. Furthermore, my sidecar is suitable for attachment to and use with a motorcycle as well as with a bicycle.

Referring now to the drawings.

Figure 1 is a side elevation view of a standard bicycle with the sidecar attached.

Fig. 2 is a front elevation view corresponding to Fig. 1.

Fig. 3 is a rear elevation view corresponding to Fig. 1.

Fig. 4 shows in plan view the primary supporting brace previous to assembly and

Fig. 5 is a similar view of the reinforcing brace.

Like numerals designate like parts throughout the various figures in which Fig. 1 shows a standard gentleman's bicycle having a horizontal bar 1 connecting the forward forked column 2 with the rear forked column 3 and a sloping bar 4 joined at its base to the sloping bar 5 to support the sprocket or gear wheel.

6 designates the body of the attached sidecar having a cockpit 7, a windowscreen 8, a single standard bicycle wheel 9 with a mudguard 10.

The body 6 rests in part on a supporting brace 11 as shown detached in Fig. 4. This supporting brace is constructed of cold rolled steel or other suitable metal, having at one end a two pronged fork. The short outer prong 11—a is designed for fixed attachment to the outer axle 13 of the car wheel 9; the long prong 11—b is similarly attached to the inner side of axle 13 and it then turns under the body 6 where it provides the ultimate support for the said body. The prong 11—b terminates at the axle 14 of the rear bicycle wheel to which it is affixed by means of a screw nut. As will be further observed by reference to Figs. 1 and 2, supporting brace 11 extends forward of its fork and is gradually curved inwardly to support the forward end of body 6 and upwardly until it meets the sloping bar 4 of the bicycle in rear of the column 2. It is removably affixed to the bar 4 by a thumb screw or other desirable means as illustrated in Fig. 1.

Referring now to the reinforcing brace 12 which is shown attached in Fig. 5, it will be seen that this member is constructed so that its upper end 12a is attachable by means of a nut to the rear forked column 3 of the bicycle immediately under the bicycle saddle. The preferred means of attaching is to slip the looped end over the bolt used for adjusting the bicycle saddle and retain it there by means of a nut or thumb screw. The reinforcing brace is so constructed that it slopes downwardly and outwardly under the rear of body 6; then upwardly and forwardly paralleling the rear forked column 3, over the mudguard 10 of the car wheel 9; thence downwardly again paralleling the rear forked column 3 to the axle 13 of the car wheel 10 to which it is permanently affixed by any suitable means.

It will be observed that the body 6 rests on the supporting brace 11 and the reinforcing brace 12, and that these members further constitute the means by which the car wheel 9 is retained in its position by utilization of axle 13. The mudguard 10, it should be stated is affixed to the sidecar by rivets to the underside of the reinforcing brace 12 where it passes over the top of the said mudguard 10.

Attention is now directed to the principal means utilized to suspend the body 6 on the said supporting and reinforcing braces. Supporting brace 11 has riveted thereto a small tempered metal flap 15. Reinforcing brace 12 is similarly equipped with two such flaps 16 and 17. The spacing of these three appendages are interrelated in such a manner, so that when the sidecar is assembled they will provide three point suspension for the body 6. In order to attach the body 6 to the sidecar the free ends of the flaps 15, 16 and 17 are reversed and said free ends are riveted to the under surface of the body 6. When the body 6 is in this position, it will be found that the flaps 15, 16, and 17 act most effectively as springs for the body 6 with excellent results. Attention is further directed to the fact that the forward flap 15 is centrally located in relation to the body 6 while the rear flaps 17 and 18 are appropriately spaced to share the support of the maximum weight of the body. It should be further observed that the reinforcing brace 12 to which the rear flaps are appended is in turn riveted centrally under the body to the supporting brace 11.

The mode of construction thus described provides an extremely light, but very sturdy, sidecar simply constructed at low cost. Its single wheel 9 it will be observed, is in direct alignment with the rear bicycle wheel and the forward end of the supporting brace 11 is curved in a particular manner to permit free turning of the front bicycle wheel. When the sidecar is occupied it will be found that the combination can be propelled by the bicycle rider with a minimum of effort. When stationary the bicycle is maintained in a perpendicular position as a result of the support given by the sidecar, again permitting the front bicycle wheel to turn freely.

Finally, attention is directed to the simplicity with which the sidecar is attached to, or detached from, any standard gentleman's bicycle or ladies' bicycle. No additional appliances are necessary to the bicycle. The rear end of the supporting brace 11 is merely bolted to the rear axle of the bicycle; the forward end of supporting brace 11 is clamped to the sloping bar 4 of the bicycle and the upper end of the reinforcing brace 12 is attached to the standard screw bolt normally used for adjusting the bicycle saddle.

What I claim is:

1. A side car adapted to be used in conjunction with a bicycle comprising a substantially U-shaped supporting brace member attached at one of its ends to the front portion of the structure of the bicycle and at the other of its ends to the rear portion of the structure of the bicycle and having a region between its ends of bifurcated construction, a wheel attached to the supporting brace member at the region of bifurcated construction, a reinforcing brace member attached to the supporting brace member at the region of bifurcated construction and attached to the structure of the bicycle, the reinforcing brace member being further attached to the supporting brace member at a point on the supporting brace member between the region of bifurcated construction and the point of attachment to the rear portion of the structure of the bicycle, a body member adapted to be carried by the supporting brace member and the reinforcing brace member and yieldable connecting means connecting the body member to the supporting brace member and the body member to the reinforcing brace member.

2. A side car according to claim 1 wherein the reinforcing member is attached to the supporting brace member at the region of bifurcated construction at a point outboard of the wheel which is also attached to the supporting brace member at the region of bifurcated construction.

3. A side car according to claim 2 wherein there is one yieldable connecting means connecting the body member to the supporting brace member and two yieldable connecting means connecting the body member to the reinforcing brace member so that the body member is carried by a three-joint yieldable suspension.

JOHN ROLLAND WARNER.

REFERENCES CITED

The following references are of record in the file of this patent:

UNITED STATES PATENTS

| Number | Name | Date |
|---|---|---|
| 900,080 | Blake | Oct. 6, 1908 |
| 1,172,995 | Hunter | Feb. 22, 1916 |
| 1,302,476 | Simons | Apr. 29, 1919 |

FOREIGN PATENTS

| Number | Country | Date |
|---|---|---|
| 94,140 | Switzerland | Aug. 11, 1921 |
| 103,501 | Australia | Mar. 17, 1938 |